(12) United States Patent
Asiabanpour et al.

(10) Patent No.: US 12,361,353 B2
(45) Date of Patent: Jul. 15, 2025

(54) AUTONOMOUS FARMING GROWTH CONTROL AND MAINTENANCE SYSTEMS

(71) Applicant: TEXAS STATE UNIVERSITY, San Marcos, TX (US)

(72) Inventors: Bahram Asiabanpour, San Marcos, TX (US); Isaac Olson, San Marcos, TX (US)

(73) Assignee: Texas State University, San Marcos, TX (US)

( * ) Notice: Subject to any disclaimer, the term of this patent is extended or adjusted under 35 U.S.C. 154(b) by 157 days.

(21) Appl. No.: 17/922,301

(22) PCT Filed: Jun. 11, 2020

(86) PCT No.: PCT/US2020/037159
§ 371 (c)(1),
(2) Date: Oct. 28, 2022

(87) PCT Pub. No.: WO2021/251969
PCT Pub. Date: Dec. 16, 2021

(65) Prior Publication Data
US 2023/0186210 A1    Jun. 15, 2023

(51) Int. Cl.
*G06Q 10/0631* (2023.01)
*A01G 7/02* (2006.01)
(Continued)

(52) U.S. Cl.
CPC ......... *G06Q 10/06315* (2013.01); *A01G 7/02* (2013.01); *A01G 25/167* (2013.01); *G06Q 10/04* (2013.01); *G06Q 50/02* (2013.01)

(58) Field of Classification Search
CPC .. G06Q 10/06315; G06Q 10/04; G06Q 50/02; A01G 7/02; A01G 25/167
(Continued)

(56) References Cited

U.S. PATENT DOCUMENTS

| RE31,023 E | 9/1982 | Hall |
| 7,215,420 B2 | 5/2007 | Gellerman et al. |

(Continued)

FOREIGN PATENT DOCUMENTS

| CN | 101491206 A | 7/2009 |
| CN | 108522241 A | 9/2018 |

(Continued)

OTHER PUBLICATIONS

US 8,224,494 B2, 07/2012, Anderson (withdrawn)
(Continued)

*Primary Examiner* — Abdallah A El-Hage Hassan
(74) *Attorney, Agent, or Firm* — Shackelford, McKinley & Norton, LLP; Farhang Amini

(57) ABSTRACT

In some embodiments, the present disclosure pertains to methods and systems for optimizing a property of a plant. In some embodiments, the methods of the present disclosure include: (1) receiving one or more growth-related parameters of the plant; (2) receiving one or more phenotype-related parameters of the plant; (3) receiving one or more qualitative parameters of the plant; (4) utilizing a computing unit to evaluate said one or more growth-related parameters, phenotype-related parameters and qualitative parameters of the plant; and (5) utilizing the computing unit to adjust the one or more of the growth-related parameters of the plant based on the evaluation. In some embodiments, the aforementioned steps are repeated a plurality of times. In some embodiments, the parameters are stored in a database and utilized by a machine-learning algorithm to optimize the evaluation of the parameters and adjustment of the growth-related parameters.

19 Claims, 13 Drawing Sheets

(51) Int. Cl.
*A01G 25/16* (2006.01)
*G06Q 10/04* (2023.01)
*G06Q 50/02* (2024.01)

(58) Field of Classification Search
USPC ........................................................ 705/7.25
See application file for complete search history.

(56) References Cited

U.S. PATENT DOCUMENTS

| | | | |
|---|---|---|---|
| 8,782,948 | B2 | 7/2014 | Harwood et al. |
| 9,058,633 | B2 | 6/2015 | Lindores et al. |
| 9,652,840 | B1 | 5/2017 | Shriver et al. |
| 10,115,158 | B2 | 10/2018 | Lindores |
| 10,607,171 | B1 | 3/2020 | Dobbins |
| 2010/0268562 | A1* | 10/2010 | Anderson ........ G06Q 10/06313 705/7.25 |
| 2013/0204437 | A1* | 8/2013 | Koselka ................ A01D 91/00 701/25 |
| 2019/0261565 | A1* | 8/2019 | Robertson ......... G06F 18/24323 |
| 2020/0383327 | A1* | 12/2020 | Oren-Shamir ......... A01N 37/44 |
| 2021/0362354 | A1 | 11/2021 | Asiabanpour et al. |
| 2022/0138869 | A1 | 5/2022 | Asiabanpour et al. |

FOREIGN PATENT DOCUMENTS

| | | |
|---|---|---|
| CN | 106546568 B | 4/2019 |
| CN | 108895964 B | 7/2020 |
| EP | 0004450 B1 | 7/1982 |
| RU | 2646091 C1 | 3/2018 |
| WO | WO 2019/173685 | 9/2019 |

OTHER PUBLICATIONS

International Search Report and Written Opinion for PCT/US2020/037159, mailed on Aug. 31, 2020.

Manual and supporting information for the CleanGrow CG200 Self-Calibrating-Auto Sampling 8 Ion Analyser, downloaded from https://www.ionselectiveelectrode.com/pages/userguides on Oct. 20, 2022.

Larisika et al., "Electronic Olfactory Sensor Based on A. mellifera Odorant-Binding Protein 14 on a reduced Graphene Oxide Field-Effect Transistor" Angew Chem, 2015, 127 (45) 13443-13446.

* cited by examiner

AUTONOMOUS FARMING GROWTH CONTROL AND MAINTENANCE SYSTEMS

STATEMENT REGARDING FEDERALLY SPONSORED RESEARCH

This invention was made with government support under 2016-38422-25540 awarded by the U.S. Department of Agriculture. The government has certain rights in the invention.

BACKGROUND

Automated farming growth control and maintenance systems have numerous limitations, including limitations in systematically compiling information over the course of plant growth, and optimizing plant growth. Numerous embodiments of the present disclosure address the aforementioned limitations.

SUMMARY

In some embodiments, the present disclosure pertains to methods of optimizing a property of a plant. In some embodiments, the methods of the present disclosure include: (1) receiving one or more growth-related parameters of the plant; (2) receiving one or more phenotype-related parameters of the plant; (3) receiving one or more qualitative parameters of the plant; (4) utilizing a computing unit to evaluate said one or more growth-related parameters, phenotype-related parameters and qualitative parameters of the plant; and (5) utilizing the computing unit to adjust the one or more of the growth-related parameters of the plant based on the evaluation.

In some embodiments, the aforementioned steps are repeated a plurality of times. In some embodiments, the aforementioned parameters are stored in a database and utilized by a computing unit's machine-learning algorithm to optimize the evaluation of the parameters and adjustment of the growth-related parameters. As such, in some embodiments, the computing unit is capable of learning from its performance and adapting the created knowledge into real-time and routine adjustments.

In some embodiments, the growth-related parameters include, without limitation, growth medium pH, growth medium gas levels, growth medium $O_2$ levels, growth medium $CO_2$ levels, growth medium temperature, growth medium algae amount, growth medium volume, growth medium water content, ambient humidity, ambient temperature, ambient gas levels, ambient air composition, ambient $O_2$ levels, ambient $CO_2$ levels, ambient light intensity, ambient light wavelength, insect levels, growth medium composition, growth medium nutrient levels, growth medium humidity, growth medium microorganism content, growth medium macro-organism content, plant watering schedule, plant feeding schedule, and combinations thereof.

In some embodiments, the one or more phenotype-related parameters include, without limitation, plant shape, plant size, plant color, plant chlorophyll content, plant temperature, and combinations thereof. In some embodiments, the one or more qualitative parameters include, without limitation, plant taste, plant aroma, plant shelf life, plant texture, plant chemical composition, and combinations thereof.

In some embodiments, the adjusting of the one or more growth-related parameters occurs by increasing, decreasing, maintaining, or eliminating one or more of the growth-related parameters. In some embodiments, the parameter receiving, evaluation, and adjusting steps occur automatically through the utilization of a mechanical unit.

In some embodiments, the mechanical unit is associated with the computing unit. In some embodiments, the mechanical unit provides the computing unit with the one or more growth-related parameters, the one or more phenotype-related parameters, and the one or more qualitative parameters for evaluation. In some embodiments, the computing unit actuates the mechanical unit to perform the adjustment of the one or more growth-related parameters.

In some embodiments, the plant property to be optimized includes, without limitation, plant growth rate, plant aroma, plant taste, plant crop generation rate, and combinations thereof. In some embodiments, the plant is a crop-generating plant, such as tomato plants, potato plants, wheat, sugarcane, and combinations thereof.

Additional embodiments of the present disclosure pertain to systems for optimizing a property of a plant. The systems of the present disclosure generally include the computing units of the present disclosure and the mechanical units of the present disclosure in various arrangements.

FIGURES

FIG. 1 illustrates a method of optimizing a property of a plant in accordance with the methods of the present disclosure.

FIG. 2 provides an illustration of "Holistic Grow", a system for optimizing plant growth and maintenance. CPS stands for a cyber-physical system.

FIG. 3 provides an illustration of desired and current level of nutrients in solutions.

FIG. 4 provides a schematic of a multi inlet and outlet manifold that receives and sends solutions from and to designated end-user reservoirs (A), bidirectional pumps (B), and dual purpose mixing and measurement reservoirs (C).

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Automated farming growth control and maintenance systems are increasing in popularity within the agriculture community. These systems take on various forms, including (i) perception technologies (e.g., cameras and other sensors which can monitor for color and other factors, such as disease); (ii) artificial intelligence, which can process the data from the sensors and formulate solutions; (iii) and automated and autonomous mechatronics (e.g., robots and other automated machines that pick the produce when it is ready for market or apply immediate cures to ailments during their growing).

Many types of automated farming systems are applied primarily in the areas of vertical farming and controlled environment agriculture. During vertical farming, these types of automated systems are critical because they alert users of issues or deficiencies in the cultivation process. Moreover, such maintenance systems commonly control variables such as temperature, humidity, carbon dioxide, light, nutrient concentration, pH, and fertilizers.

However, existing systems have limited ability in systematically compiling information over the course of plant growth. As such, existing systems have limitations in improving future farming methods of the same plant species.

Accordingly, a need exists for improved methods of optimizing plant growth. Numerous embodiments of the present disclosure address the aforementioned need.

Figure 1:
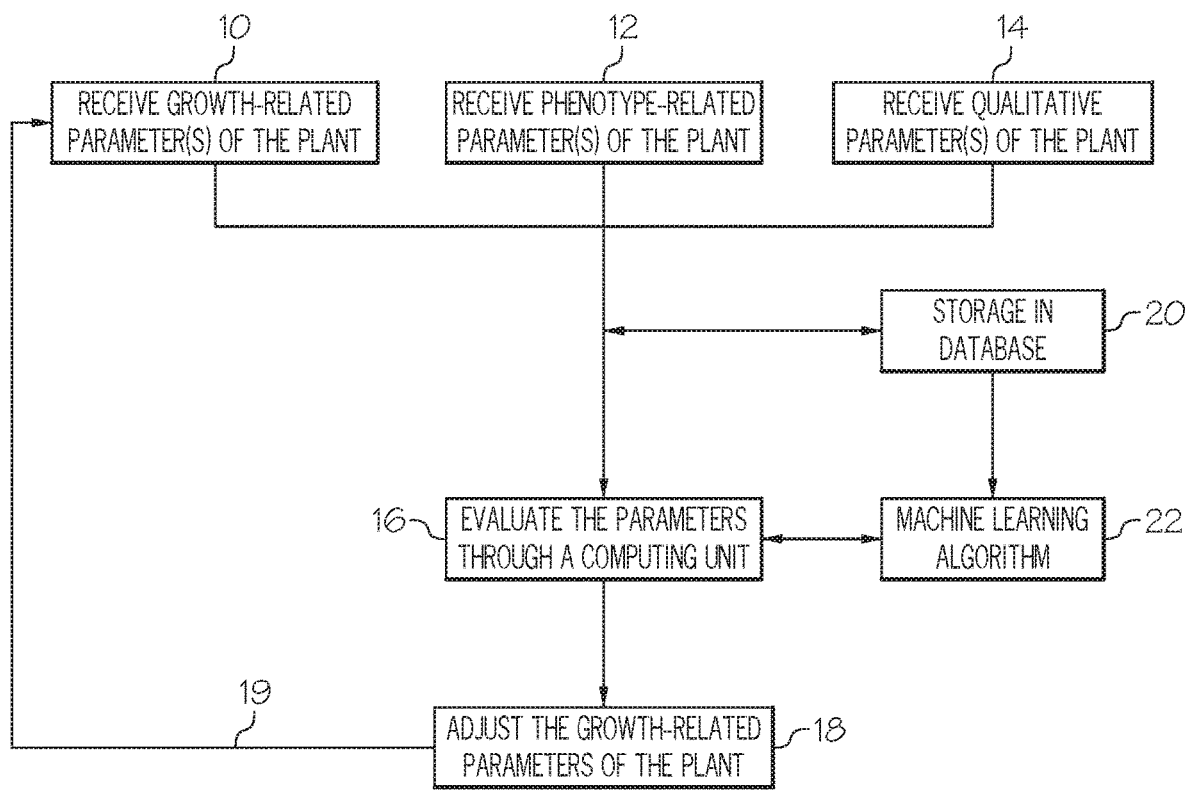

In some embodiments, the present disclosure pertains to methods of optimizing a property of a plant. In some embodiments illustrated in FIG. 1, the methods of the present disclosure include: receiving one or more growth-related parameters of the plant (step 10); receiving one or more phenotype-related parameters of the plant (step 12); receiving one or more qualitative parameters of the plant (step 14); utilizing a computing unit to evaluate said one or more growth-related parameters, phenotype-related parameters and qualitative parameters of the plant (step 16); and utilizing the computing unit to adjust the one or more growth-related parameters of the plant based on the evaluation (step 18).

In some embodiments, the aforementioned steps are repeated a plurality of times (step 19). In some embodiments, the parameters are stored in a database (step 20) and utilized by a machine-learning algorithm (step 22) to optimize the evaluation of the parameters (step 16) and adjustment of the growth-related parameters (step 18).

As set forth in more detail herein, the present disclosure can have numerous embodiments. In particular, various methods may be utilized to receive various growth-related parameters, phenotype-related parameters, and qualitative parameters of various plants. Moreover, various computing units and machine learning algorithms may be utilized to evaluate the aforementioned parameters. Additionally, various methods may be utilized to adjust various growth-related parameters of a plant based on the aforementioned evaluation.

Growth-Related Parameters

The methods of the present disclosure may receive and evaluate various growth-related parameters from a plant. For instance, in some embodiments, the growth-related parameters include, without limitation, growth medium pH, growth medium gas levels, growth medium $O_2$ levels, growth medium $CO_2$ levels, growth medium temperature, growth medium algae amount, growth medium volume, growth medium water content, ambient humidity, ambient temperature, ambient gas levels, ambient air composition, ambient $O_2$ levels, ambient $CO_2$ levels, ambient light intensity, ambient light wavelength, insect levels, growth medium composition, growth medium nutrient levels, growth medium humidity, growth medium microorganism content, growth medium macro-organism content, plant watering schedule, plant feeding schedule, and combinations thereof.

In some embodiments, the growth-related parameters include growth medium nutrient levels. In some embodiments, the growth medium nutrient levels include growth medium nutrient ions. In some embodiments, the growth medium nutrient ions include, without limitation, nitrogen (N), phosphorus (P), potassium (K), calcium (Ca), magnesium (Mg), sulfur (S), chlorine (Cl), iron (Fe), manganese (Mn), zinc (Zn), copper (Cu), boron (B), molybdenum (Mo), nickel (Ni), oxygen (O), carbon (C), hydrogen (H), ammonium nitrate ($NH_4NO_3$), superphosphate ($P_2O_5$), potash (KCl), fertilizers, monoammonium phosphate ($NH_4H_2PO_4$), and combinations thereof.

The growth-related parameters of plants may be associated with various plant growth media. For instance, in some embodiments, the plant growth medium includes soil. In some embodiments, the plant growth medium includes a liquid. In some embodiments, the liquid is in the form of a solution.

In some embodiment, the plant growth medium includes a vertical growth medium. In some embodiments, the plant growth medium includes a controlled growth environment Various methods may be utilized to receive the one or more growth-related parameters. For instance, in some embodiments, the one or more growth-related parameters are received by sampling the growth medium of the plant.

In some embodiments, the one or more growth-related parameters are received by measuring the one or more growth-related parameters. In some embodiments, the measuring occurs through the utilization of one or more sensors.

In some embodiments, the one or more growth-related parameters are received in an automated manner at set periods of time. For instance, in some embodiments, a pump and a programmable manifold with multiple multi inlet and outlet valves can be utilized to pull a pre-determined amount of a growth medium sample (e.g., a growth medium solution) from the plant growth medium to a central processing tank (e.g., a mixing reservoir) as scheduled. Additional methods of receiving one or more growth-related parameters can also be envisioned.

Phenotype-Related Parameters

The methods of the present disclosure may receive and evaluate various phenotype-related parameters from a plant. For instance, in some embodiments, the one or more phenotype-related parameters include, without limitation, plant shape, plant size, plant color, plant chlorophyll content, plant temperature, and combinations thereof.

The phenotype-related parameters may be associated with various components of a plant. For instance, in some embodiments, the phenotype-related parameters may be associated with plant leaves, plant roots, plant shoot, plant fruits, and combinations thereof.

Various methods may be utilized to receive the one or more phenotype-related parameters. For instance, in some embodiments, the one or more phenotype-related parameters are received through the utilization of various devices. In some embodiments, the devices include, without limitation, cameras, video recorders, laser scanners, probes, image processors, thermal cameras, thermal sensors, and combinations thereof. Additional methods of receiving one or more phenotype-related parameters can also be envisioned.

Qualitative Parameters

The methods of the present disclosure may receive and evaluate various qualitative parameters from a plant. For instance, in some embodiments, the one or more qualitative parameters include, without limitation, plant taste, plant aroma, plant shelf life, plant texture, plant chemical composition, and combinations thereof.

The qualitative parameters may be associated with various components of a plant. For instance, in some embodiments, the qualitative parameters may be associated with plant leaves, plant roots, plant shoot, plant fruits, and combinations thereof.

Various methods may be utilized to receive one or more qualitative parameters from a plant. For instance, in some embodiments, the receiving occurs through collection of plant components for chemical analysis. In some embodiments, the collection occurs through the utilization of a plant sampling unit. In some embodiments, the plant sampling unit includes a mechanism for cutting a plant component (e.g., a plant leaf), securing the plant component (e.g., a plastic seal, case or cap), and a delivery component (e.g., a suction mechanism, a batch delivery mechanism, a robotically-driven delivery mechanism, and the like). In some embodiments, the plant sampling unit is associated with the computing unit.

The chemical analysis of plants may occur in various manners. For instance, in some embodiments, the chemical analysis occurs through methodologies that include, without limitation, spectroscopy, mass spectrometry, chemiresistance measurements, biomimetic smell sensing, X-ray fluorescence (XRF), energy dispersive X-ray fluorescence (EDXRF), and combinations thereof.

Evaluation of Parameters

Various methods may be utilized to evaluate growth-related parameters, phenotype-related parameters and qualitative parameters of a plant. For instance, in some embodiments, the evaluation occurs in real-time. In some embodiments, the evaluation occurs in a continuous manner.

In some embodiments, the evaluation occurs through the utilization of a computing unit. In some embodiments, the computing unit includes an algorithm. In some embodiments, the algorithm is a machine learning algorithm. In some embodiments, the machine learning algorithm is based on supervised learning (e.g., classification and regression). In some embodiments, the machine learning algorithm is based on unsupervised learning (e.g., clustering).

In some embodiments, the computing unit conducts the evaluation by comparing the growth-related parameters, phenotype-related parameters and qualitative parameters of the plant with desirable levels of the parameters. In some embodiments, the desirable levels are stored in one or more databases. In some embodiments, the desirable levels are based on the plant type and age.

In some embodiments, the computing unit saves the growth-related parameters, phenotype-related parameters and qualitative parameters in real-time onto one or more databases. Thereafter, the computing unit utilizes a machine learning algorithm to compute desirable levels of the parameters from the stored parameters in the one or more databases In some embodiments, the desirable levels of the parameters are determined by matching the stored data with ultimate plant growth goals (e.g., goals in terms of good taste, aroma, and plant growth) to identify the one or more growth-related parameters to be adjusted.

Adjusting Growth-Related Parameters

Various methods may also be utilized to adjust one or more growth-related parameters after an evaluation of a plant's growth-related parameters, phenotype-related parameters and qualitative parameters. For instance, in some embodiments, the adjusting occurs by increasing one or more of the growth-related parameters. In some embodiments, the adjusting occurs by decreasing one or more of the growth-related parameters. In some embodiments, the adjusting occurs by maintaining one or more of the growth-related parameters. In some embodiments, the adjusting occurs by eliminating one or more of the growth-related parameters.

Adjustment of one or more growth-related parameters can occur through various mechanisms. For instance, in some embodiments, the adjusting occurs in real-time by the computing unit. In some embodiments, the adjusting occurs automatically by the computing unit.

In some embodiments, the adjusting occurs manually based on instructions provided by the computing unit. For instance, in some embodiments, the computing unit determines how one or more growth-related parameters must be adjusted. Thereafter, the instructions are provided to an end-user (e.g., a farmer) to adjust the one or more growth-related parameters.

The methods of the present disclosure can be utilized to adjust various growth-related parameters. For instance, in some embodiments, the adjusting occurs by adjusting at least one of growth medium pH, growth medium $O_2$ levels, growth medium temperature, growth medium water content, ambient temperature, ambient $O_2$ levels, growth medium nutrient levels, plant watering schedule, plant feeding schedule, and combinations thereof.

In some embodiments, the adjusting occurs by adjusting growth medium pH. For instance, in some embodiments where a pH level in the growth medium is determined by a computing unit to be above a recommended level for the designated plant, the computing unit adds a pH balancing material to the growth medium.

In some embodiments, the adjusting occurs by adjusting ambient temperature. For instance, in some embodiments where the computing unit determines that ambient temperature is above a safe zone for a plant, the computing unit activates a cooling air conditioning system that is capable of reaching the plant's ambient environment.

Mechanical Units

In some embodiments, the parameter receiving, evaluation, and adjusting steps occur automatically through the utilization of a mechanical unit. In some embodiments, the mechanical unit is associated with the computing unit. In some embodiments, the mechanical unit provides the computing unit with the one or more growth-related parameters, the one or more phenotype-related parameters, and the one or more qualitative parameters for evaluation. In some embodiments, the computing unit actuates the mechanical unit to perform the adjustment of the one or more growth-related parameters.

In some embodiments, the mechanical unit is associated with an automated compensating mechanism. In some embodiments, the automated compensating mechanism adjusts the one or more growth-related parameters.

In some embodiments, the mechanical unit includes a robotic arm, joints associated with the robotic arm, and one or more bidirectional tubes associated with the robotic arm.

In some embodiments, the bidirectional tubes can be utilized to receive parameters from the plant and adjust growth-related parameters.

In some embodiments, the mechanical unit includes a pump and a programmable manifold with multiple multi inlet and outlet valves that can be utilized to pull a predetermined amount of a growth medium sample (e.g., a growth medium solution) from a plant growth medium to a central processing tank (e.g., a mixing reservoir) as scheduled. In some embodiments, the central processing tank is associated with the computing unit.

In some embodiments, the mechanical unit includes: a mobile component that is accessible to the plant (e.g., a drone, mobile robot, gantry system, or an expandable hose); a maneuverable middle joint (e.g., a moving mechanism or a robotic arm); and a multi-purpose end-effector with interchangeable components (e.g., an end effector with a fitting place for various sensors, such as video sensors, photothermal cameras, chlorophyll readers, thermometers, humidity sensors, light measuring sensors, and the like).

In some embodiments, the mechanical unit is in the form of a bidirectional unit that utilizes a bidirectional tubing, pump, and mixing and treatment reservoir. In some embodiments, the bidirectional unit is associated with the computing unit to form a fully automated system that is capable of actively (1) receiving growth-related parameters, phenotype-related parameters, and qualitative parameters, (2) delivering data and samples securely, (3) storing data and samples in a structured format, (4) retrieving data and samples accurately, (5) processing, integrating, analyzing, and interpreting data and samples, and (6) scheduling or conducting required future actions.

Continuous Monitoring and Adjustment

In some embodiments, the parameter receiving, evaluation, and adjusting steps occur in real-time. In some embodiments, the parameter receiving, evaluation, and adjusting steps occur in a continuous manner. In some embodiments, the parameter receiving, evaluation, and adjusting steps occur at set periods of time.

In some embodiments, the parameter receiving, evaluating and adjusting steps are repeated multiple times. In some embodiments, a machine-learning algorithm is utilized to optimize the adjusting step based on the repeated evaluation of the growth-related parameters, phenotype-related parameters and qualitative parameters of the plant. As such, in some embodiments, the computing unit is capable of learning from its performance and adapting the created knowledge into real-time and routine adjustments.

In some embodiments, identified input settings and other parameters that have resulted in the best overall desirable performance will replace existing settings and parameters. Thereafter, the process is repeated. In some embodiments, multi-response optimization techniques, response surface methodologies, desirability function models, composite desirability, and canonical and ridge analyses are used to identify a group of parameters that simultaneously produce improved performance and achieve overall desirable performance.

Optimization of Plant Properties

The methods of the present disclosure can be utilized to optimize various plant properties. For instance, in some embodiments, the plant property to be optimized includes, without limitation, plant growth rate, plant aroma, plant taste, plant crop generation rate, and combinations thereof.

Plants

The methods of the present disclosure can be utilized to optimize the properties of various plants. For instance, in some embodiments, the plant is a crop-generating plant. In some embodiments, the crop-generating plant includes, without limitation, tomato plants, potato plants, wheat, and sugarcane.

Systems for Optimizing a Property of a Plant

Additional embodiments of the present disclosure pertain to systems for optimizing a property of a plant. The systems of the present disclosure generally include the computing units of the present disclosure and the mechanical units of the present disclosure. The computing units of the systems of the present disclosure are operable for receiving one or more growth-related parameters of the plant, one or more phenotype-related parameters of the plant, and one or more qualitative parameters of the plant. The computing units of the systems of the present disclosure are further operable to evaluate the growth-related parameters, phenotype-related parameters and qualitative parameters of the plant and adjust one or more growth-related parameters of the plant based on the evaluation.

The mechanical units of the systems of the present disclosure are operable for providing the computing unit with one or more growth-related parameters, phenotype-related parameters, and qualitative parameters. The mechanical units of the systems of the present disclosure are also operable for adjusting the one or more growth-related parameters upon actuation by the computing unit.

Suitable mechanical units and computing units were described previously. For instance, in some embodiments, the mechanical unit includes one or more sensors for receiving one or more growth-related parameters from a plant. In some embodiments, the mechanical unit is associated with one or more devices for receiving one or more phenotype-related parameters. In some embodiments, the one or more devices include, without limitation, cameras, video recorders, laser scanners, probes, image processors, thermal cameras, thermal sensors, and combinations thereof.

In some embodiments, the computing unit in the systems of the present disclosure includes a machine learning algorithm and one or more databases that were described previously. In some embodiments, the computing unit is capable of saving the one or more growth-related parameters, phenotype-related parameters and qualitative parameters in real-time onto the one or more databases. In some embodiments, the machine learning algorithm is capable of accessing the stored information.

Applications and Advantages

The methods and systems of the present disclosure provide numerous advantages. For instance, in some embodiments, the methods and systems of the present disclosure can provide real-time sampling, computing, and compensating for all of a plant's needs to grow and taste at optimum rates under a single decision-making unit and delivery system. In some embodiments, the computing units utilized in accordance with the methods and systems of the present disclosure have the capability of learning from their performance and adapting the created knowledge into its real-time and routine interactions. In some embodiments, database structure, retrieval, and processing units utilized in accordance with the methods and systems of the present disclosure allow for assessing real-time and long-term interaction of one treatment (e.g., adding potassium ion or cooling) on other components (e.g., increasing pH level). This in turn provides an end user the ability to combine and test different plant treatment options with some foresight as to its likelihood of success.

In some embodiments, the methods and systems of the present disclosure provide electromechanical automation that builds upon a computing unit's analysis to cancel or schedule any number of future tasks based on the conditions available and the chance of favorable growth.

The methods and systems of the present disclosure provide numerous applications. For instance, in some embodiments, the methods and systems of the present disclosure allow for finding alternative lowest cost and fastest implementation decisions among all options (e.g., the addition of nitrogen versus lowering ambient temperature)

The methods and systems of the present disclosure may also be utilized in numerous settings. For instance, in some embodiments, the methods and systems of the present disclosure can be utilized for optimizing vertical farming or land-based farming.

ADDITIONAL EMBODIMENTS

Reference will now be made to more specific embodiments of the present disclosure and experimental results that provide support for such embodiments. However, Applicants note that the disclosure herein is for illustrative purposes only and is not intended to limit the scope of the claimed subject matter in any way.

Example 1. Holistic Grow: Design of a Fully Autonomous Farming Growth Control and Maintenance System In this Example, Applicants describe an integrated multi-station growing support system capable of real-time sampling, computing, and compensating all plants' needs to grow and taste at the optimum rates under a single decision-making unit and delivery system (referred to herein as "Holistic Grow"). Plants' needs and health are captured and analyzed in four levels of automation comparable to Industry 4.0 levels: (1) Level I: pre-defined amount of feeding on set times; (2) Level II: feedback from growth medium (e.g., solution) and ambient; (3) Level III: feedback from the plant; (4) Level IV: feedback from the taste, aroma, and shelf life.

Holistic Grow utilizes perception technologies (e.g., cameras and other sensors which can monitor for color and other factors, such as disease) in processing data and formulating solutions. In particular, Holistic Grow utilizes artificial intelligence, which can process the data from the sensors and formulate solutions. Holistic Grow can also utilize automated and autonomous mechatronics, such as robots and other automated machines that pick the produce when it is ready for market or apply immediate cures to ailments during their growing. Holistic Grow also offers a variety of control functions associated with ensuring optimal growth rates for plants.

This system systematically compiles information over the course of plant growth, thereby improving future farming methods of the same plant species. The proposed system takes the extra step of not only offering immediate feedback to the user and implementing remedial actions in case of the conditions fatal to the plant, but also storing relevant information learned from its performance and adapting that created knowledge into its real-time routine interactions.

Holistic Grow is a bio-inspired system that mimics human's circulatory system, five senses, brain, and limbs in its components to supply water, nutrition, and oxygen to the plants, to sense and adjust the temperature, humidity, and light intensity, to clean solution from impurities, to record all conditions, and to think, plan, schedule, and act proper actions.

Figure 2:
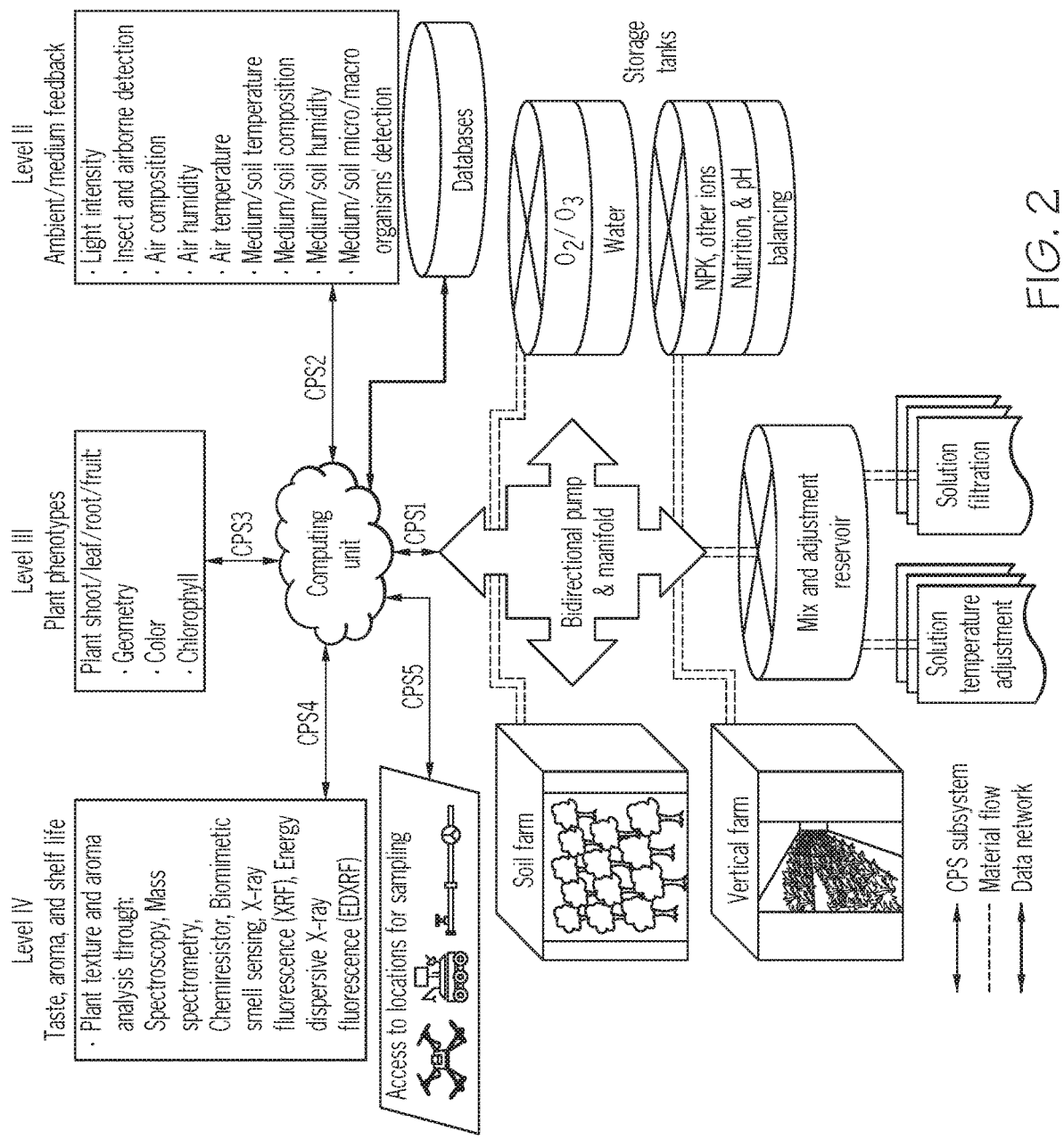

FIG. 2 illustrates the diagram of the proposed system. It is designed to be versatile (e.g., any plants, indoor or outdoor, vertical farming or land-based farming), adaptable (e.g., for the current and future sensors and subsystems), and scalable (e.g., to any number of plants, nutrients, and grow areas). Depending on the type of data, and to minimize the data computational and storage redundancy, it utilizes all four levels of automation.

Several components of Holistic Grow are networked, adaptive, predictive, intelligent, and real time. FIG. 2 illustrates five cyber physical systems (CPS1 to 5). They all have components of connection to the computing unit, measurement of a parameter, activation of a subsystem followed by recording data for long-term analysis and optimization.

Example 1.1. CPS1: Precision Delivery and Balancing of Ions, Compounds, pH, Dissolved Oxygen To explain the process and proof of concept, prototype alpha of the CPS1 for six ions and eight designated delivery locations has been designed and developed. This porotype utilizes a unique design where a single pump and mixing reservoir can accurately draw a sample, measure all parameters, and deliver an accurate amount of nutrient to the designated areas. The concept can be expanded to any more parameters and designations. In this system, the following four steps are implemented.

Example 1.1.1. Sampling

A pump and programmable manifold with multiple multi inlet/outlet valve pull the pre-determined amount of solution from a reservoir to a central processing tank (i.e., mixing reservoir) as scheduled. The same mechanism pushes the treated solution back to the designated end-user.

Example 1.1.2. Measuring

All relevant sensors measure ion-specific nutrition (K, N, P, Mn, Mg, etc.), pH, algae level, and water temperature and oxygen level (list in Table 1).

TABLE 1

| Important ions, compounds, and parameters in plants' growth. | |
|---|---|
| Ions | Nitrogen (N), phosphorus (P), potassium (K), calcium (Ca), magnesium (Mg), sulfur (S), chlorine (Cl), iron (Fe), manganese (Mn), zinc (Zn), copper (Cu), boron (B), molybdenum (Mo), nickel (Ni), oxygen (O), carbon (C), and hydrogen (H) |
| Compounds | Single nutrient ("straight") fertilizers (e.g., Ammonium nitrate ($NH_4NO_3$), superphosphate ($P_2O_5$ "Single superphosphate" (SSP) consists of 14-18% $P_2O_5$), Potash (KCl)), b- Binary (NP, NK, PK) fertilizers (e.g., monoammonium phosphate or MAP ($NH_4H_2PO_4$)), or c- NPK (nitrogen, phosphorus, and potassium) fertilizers in the form of (16-4-8) format. |
| Other parameters | pH (the acidity or alkalinity of the solution ranging 0 to 14), $O_2$ (Dissolved oxygen in solution), temperature of the growth medium, algae amount float in the solution; and ambient such as temperature, humidity, $CO_2$, airborne particles, and light. |

Example 1.1.3. Computing

Figure 3:
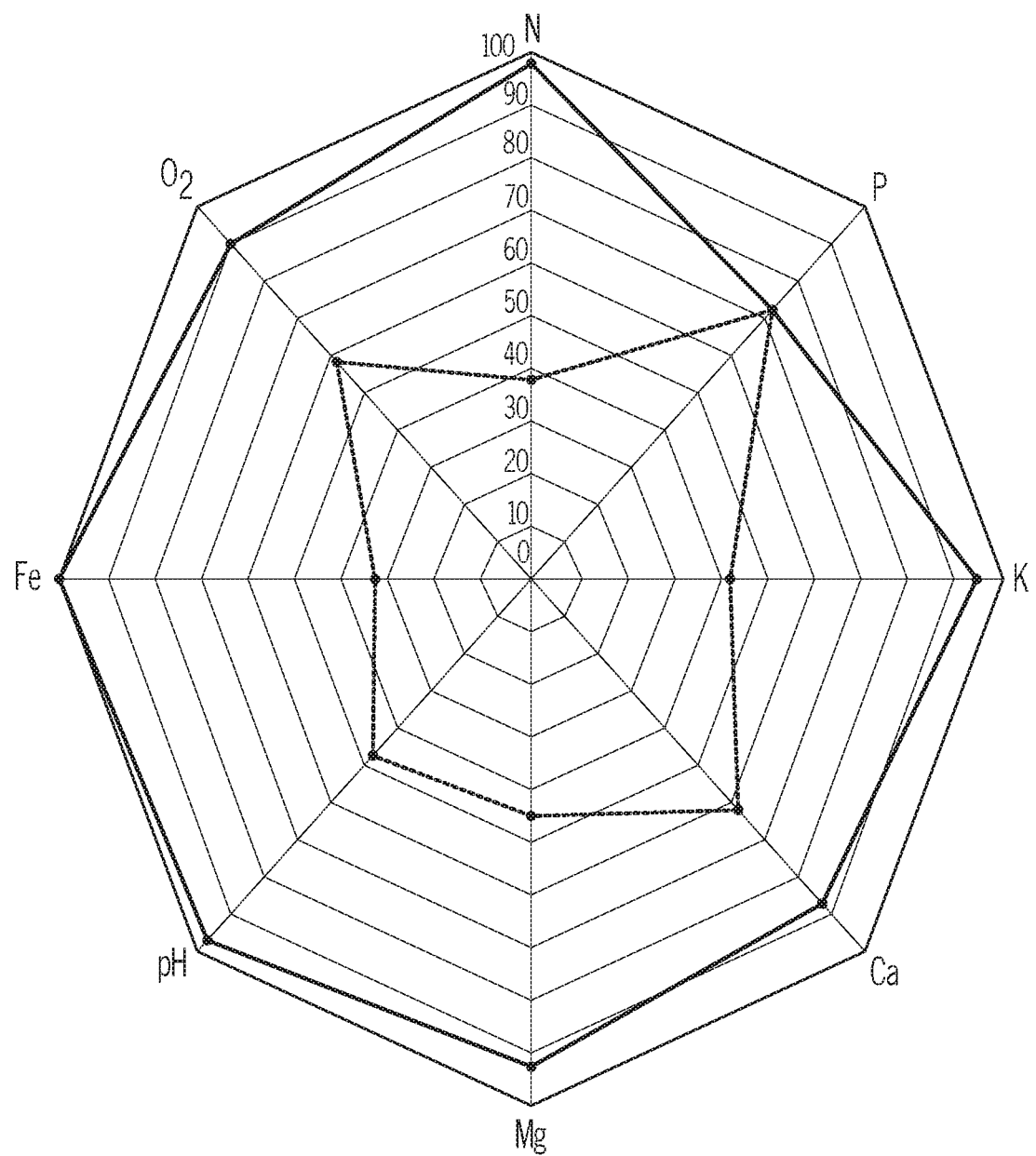

A smart computing processing unit compares the current level with the ideal level for the plant type and age and calculates and sends compensating actions (FIG. 3).

Example 1.1.4. Activating

In cases that solution ions adjustment are needed, the required amount of compensating nutrient ions are calculated and added to the mixing reservoir in liquid or solid form. An additional amount of water is added and the air bubbling mixing operation is activated. To prevent any shock to the plant and because of some interactions between the chemicals, the nutrition release is done in a smart incremental fashion.

Figure 4:
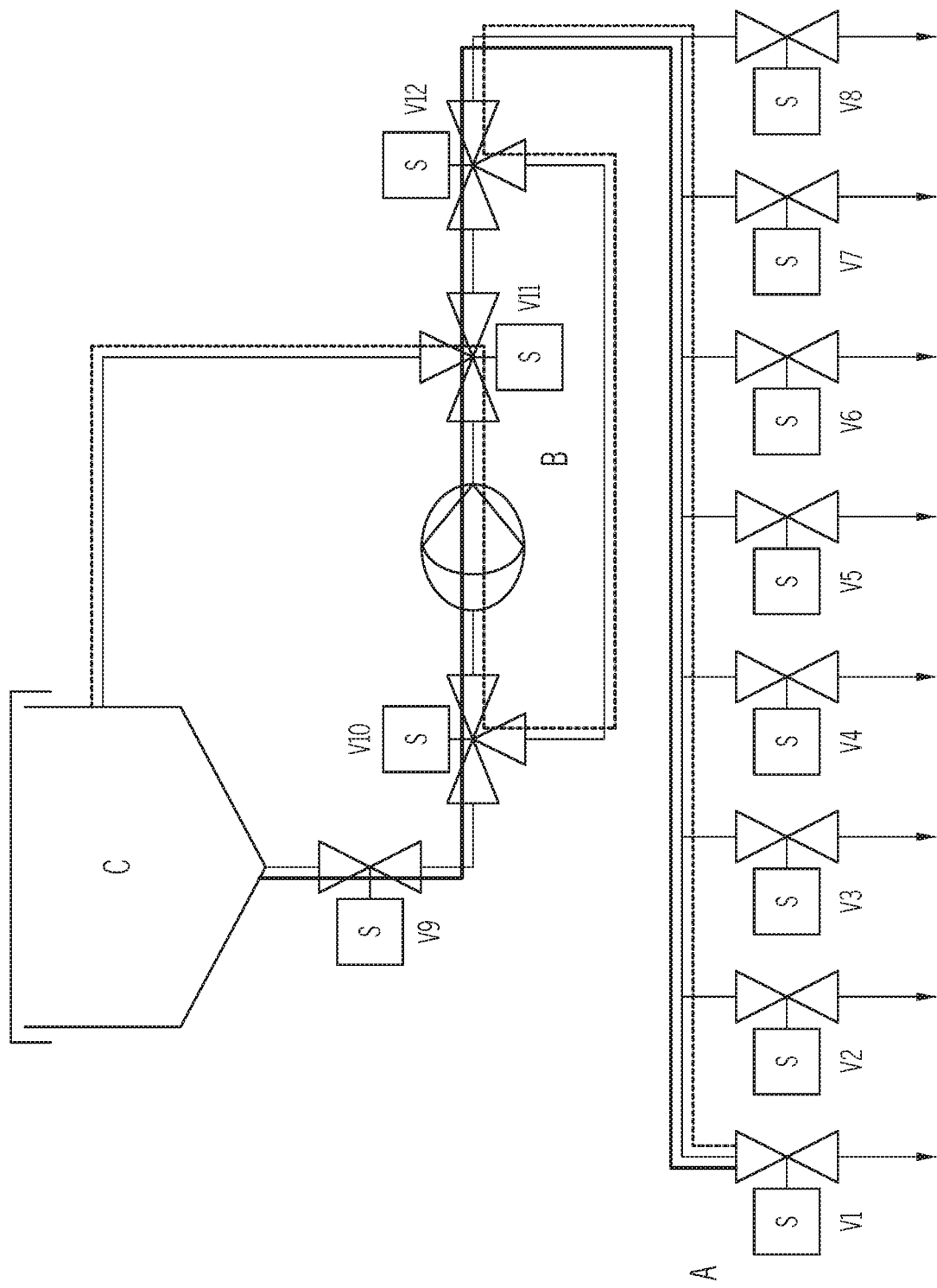
Figure 5:
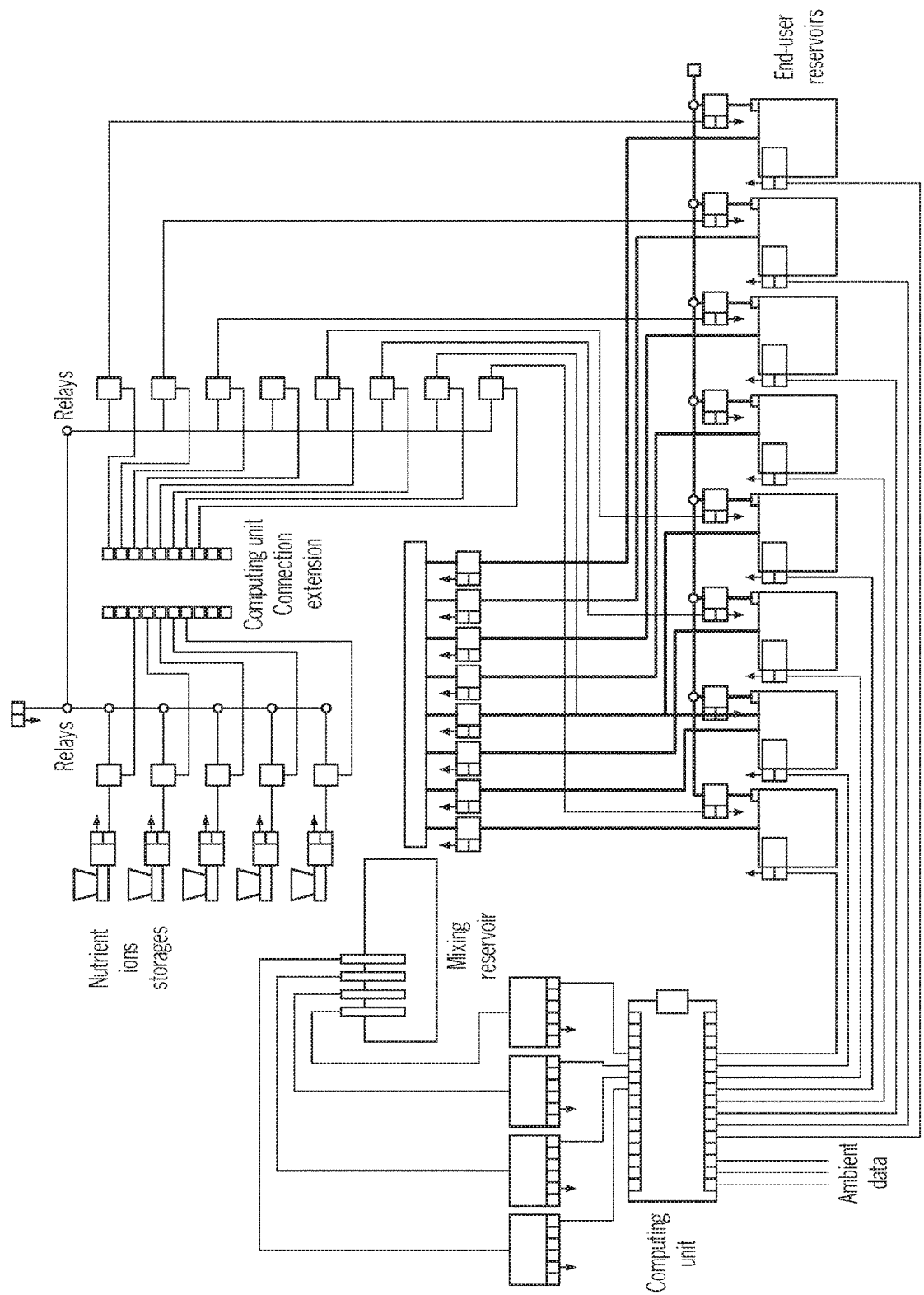
FIG. 5 illustrates a Holistic Grow electric and plumbing system.
Figure 6A:
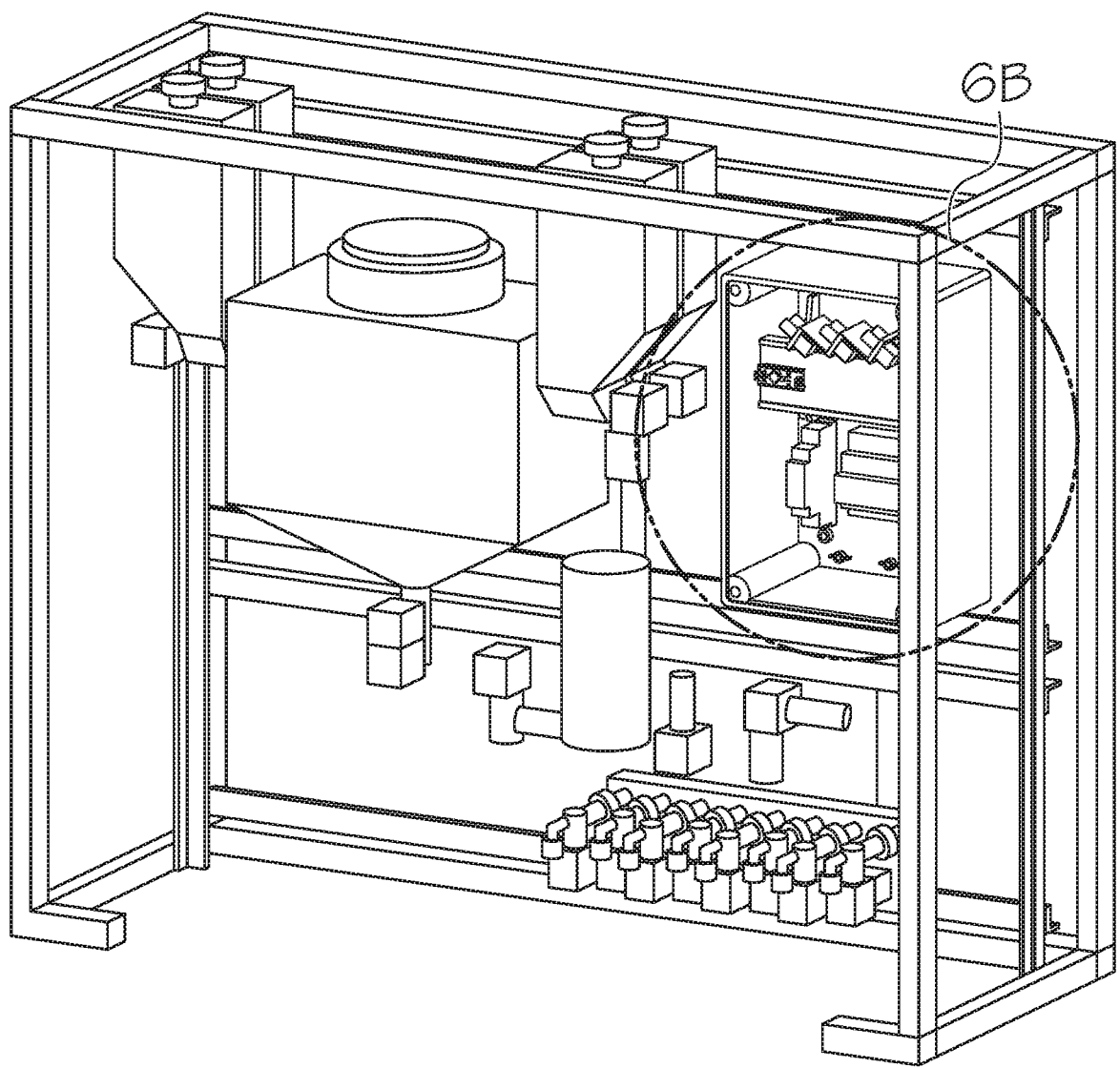
FIG. 6 illustrates a Holistic Grow nutrition measurement and compensation CPS subsystem. Clockwise: overview, control panel, circuit and sensors connections, and Arduino Nano.
Figure 6B:
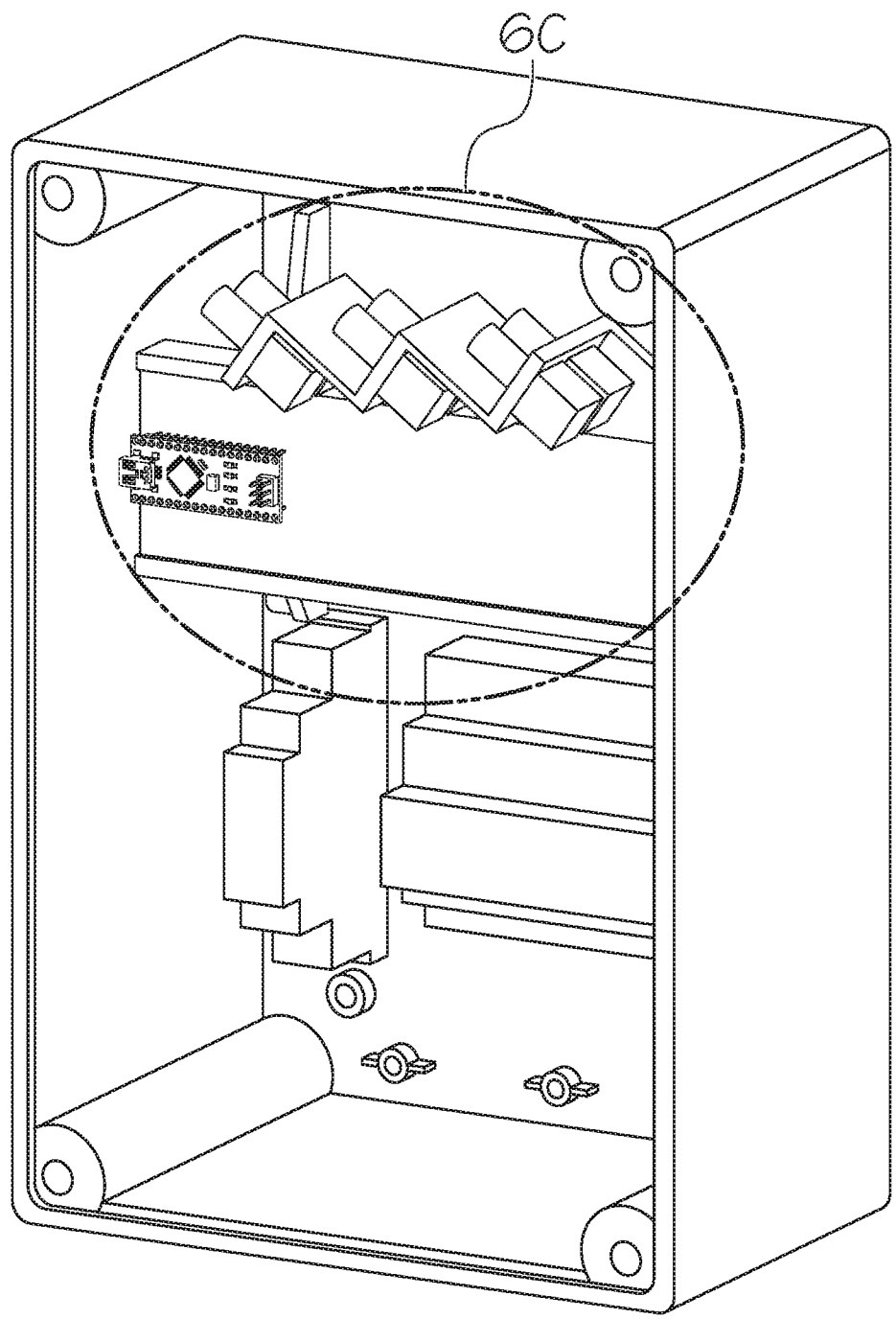
Figure 6C:
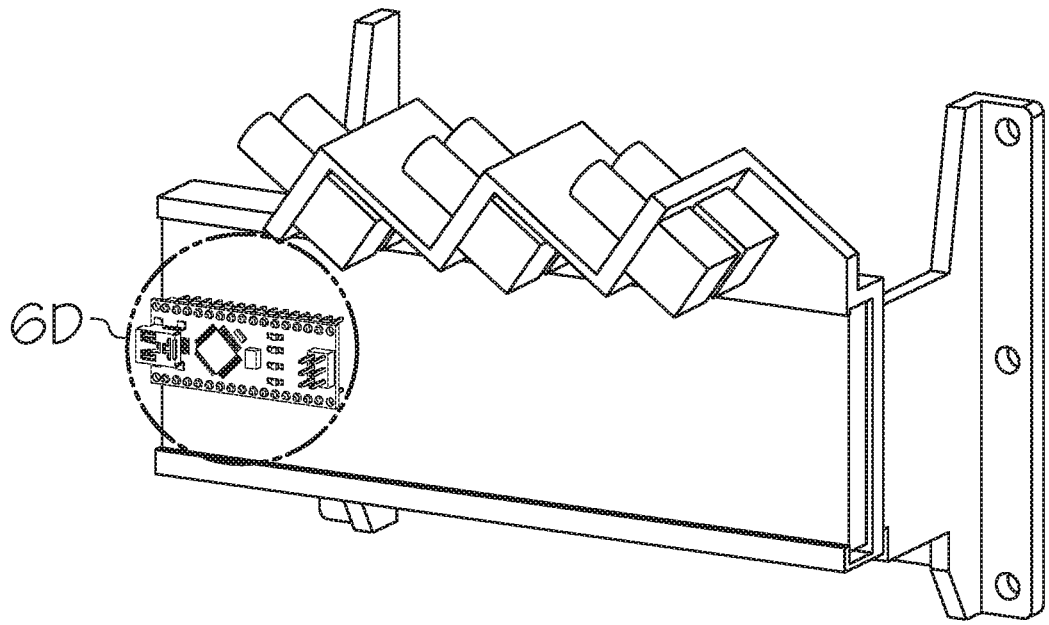
Figure 6D:
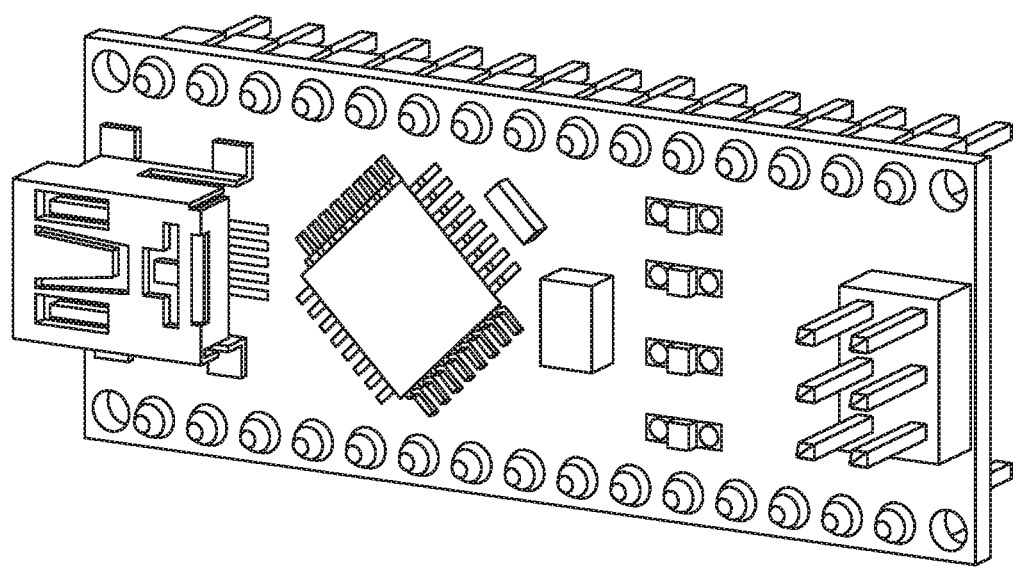
Figure 7A:
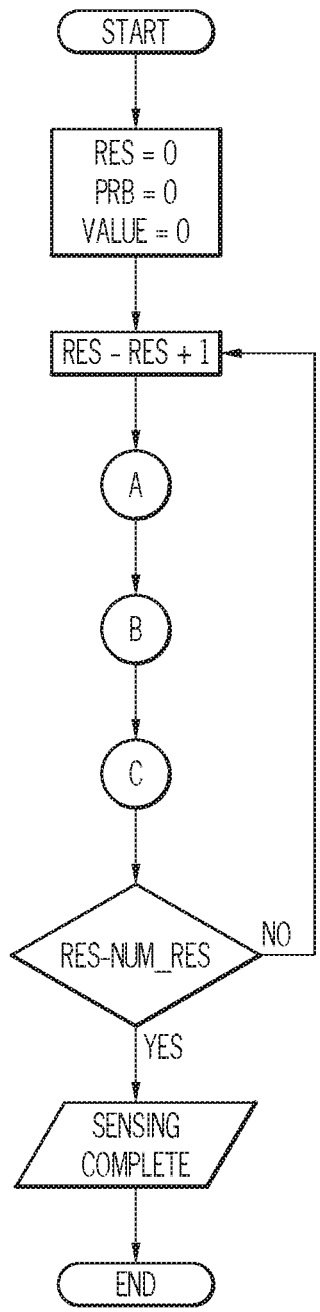
FIG. 7 illustrates Holistic Grow compensation procedures.
Figure 7B:
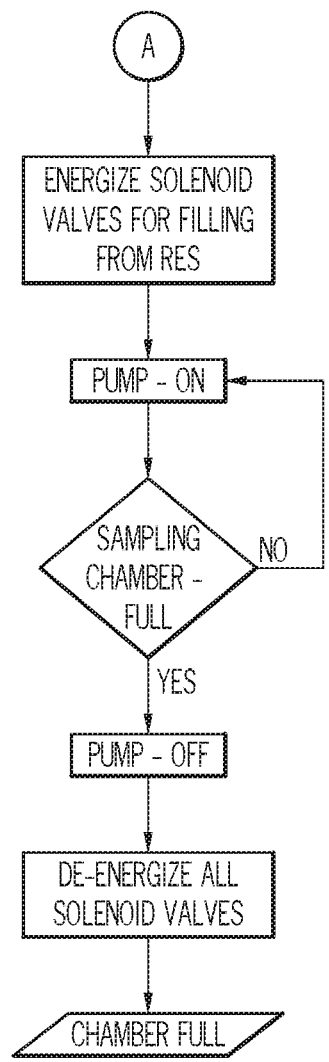
Figure 7C:
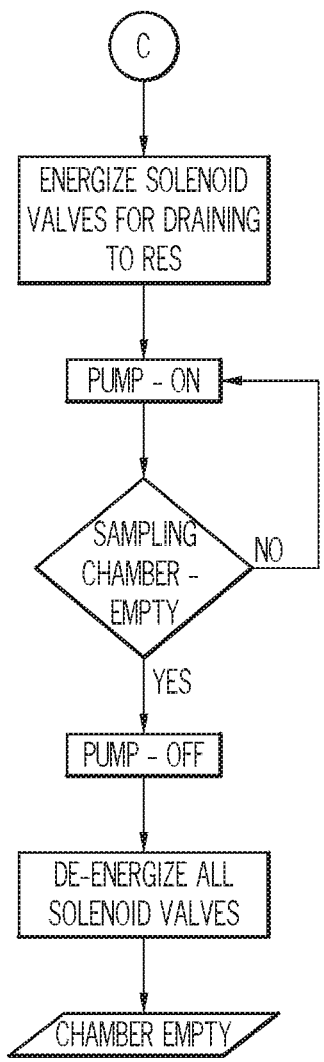
Figure 7D:
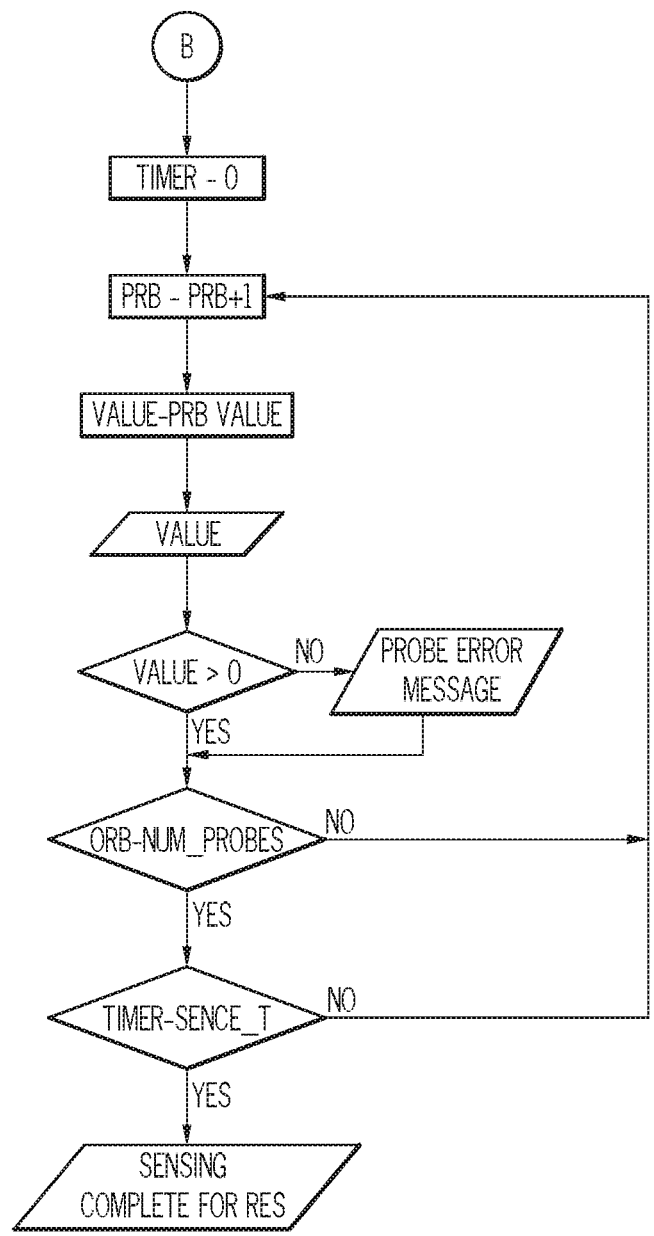

Finally, the solution is sent to the designated end-user reservoir (FIGS. 4-5). For other parameters (e.g., temperature, $O_2$, Algae level, $CO_2$, etc.), other instruments will be activated:

Example 1.1.4.1. Temperature

In cases where solution temperature adjustments are needed, one of two systems will be activated.

In the first system, a predefined amount of nutrient solution is pulled from the reservoir to the processing tank, where it is cooled or heated using a chilling or heater mechanism. The solution is then sent back to the designated end-user reservoir. If needed, the process can be repeated until the desired temperature is achieved.

In the second system, a chiller or heater mechanism that is inside the designated reservoir is activated until the nutrient temperature is reached to the desired temperature.

Example 1.1.4.2. Oxygen

In cases where water oxygen level adjustments are needed, one of two systems will be activated.

In the first system, a predefined amount of nutrient solution is pulled from the reservoir to the processing tank. Next, an oxygen injecting mechanism, such as a bubbler, increases the oxygen level. Thereafter, the liquid is sent back to the designated reservoir. If needed, the process can be repeated until the desired oxygen level is achieved.

In the second system, the oxygen release pump inside the designated reservoir is activated until the oxygen level in the solution is reached to the desired level.

Example 1.1.4.3. Algae Control

For algae control, one of the proper actions are activated. In the first system, a redefined amount of nutrient solution is pulled from the reservoir and is passed through filters. In the second system, UV light inside the mixing or end-user reservoir is turned on. The solution is then directed to a safe area and proper algae control such as ozone bubbling system or cooling mechanism is activated. The treated solution is sent back to the designated end-user reservoir.

Similarly, for ambient related conditions (e.g., temperatures, humidity, gases, light intensity and spectra, and insects quantity and variety) measuring, computing, and activating steps are performed accordingly. This CPS utilizes a novel logic where a single pump, a single tank, or a single plumbing design can automatically draw, measure, and compensate multiple nutrients from multiple input sources to multiple output destinations while logging all activities in a relevant database.

Example 1.2. CPS2: Ambient and Medium Feedback

CPS2 mainly pertains to communication with sensors related to ambient and medium conditions (e.g., light intensity, air composition, air humidity, air temperature, medium/soil temperature, medium/soil composition, medium/soil humidity, medium/soil micro and macro organisms, and insects and airborne). There are various types of commercially available sensors for these conditions. Among challenges for connectivity of these sensors are their compatibility and life limit. Also, for some parameters (e.g., ambient temperature) a single sensor covers a relatively large group of plants while for some others (e.g., soil humidity) area near each plant needs to be measured and recorded.

The novelty of this CPS is that it collects and standardizes a wide variety of inputs from different sensors as scheduled and records the results periodically for long-term analysis while immediate knee jerk reflex for any out of range parameters are added to the list of high priority actions (e.g., one extreme factor such as high temperature for a very short period of time is fatal to the plants).

FIG. 7 illustrates a logic for measure-corrective actions needed for variety of factors.

Example 1.3. CPS3: Phenotypes Feedback from the Plant

Accurate data collection for long-term planning, data analysis, and optimization is desirable. Holistic Grow takes in the data collection to the plant level. Different features from every plant along with its location and time are recorded for future analysis. Major characteristics in a plant to be measured include: (1) geometry, including shape and size of the plant (e.g., shoot, leaf, root, stem, fruit); (2) color of the plant (e.g., shoot, leaf, root, stem, fruit); (3) temperature of the leaves and roots; and (4) chlorophyll level of the leaves.

Major data acquisitions instruments CPS3 include camera, thermal camera, laser scanning, touching probe, and chlorophyll level reader. For the targeted parameters, a single sampling and measuring is not sufficient. For example, leaves in different heights and sides of a plant may have different geometry and chlorophyll levels. The novelty of this CPS is that the smart multisampling mechanism will collect enough data from different positions to give a clear perspective for decision making processes. It is desirable that all characteristics are measured in a nondestructive manner and concurrently. Options for moving mechanisms to carry data capturing instruments from plant to plant are discussed in CPS5.

Example 1.4. CPS4: Quality Factors Relating to Taste, Aroma, and Shelf Life

The ultimate goal of precision farming is to grow plants to optimum conditions and designated quality. Unlike some quantitative characteristics in CPS3, qualitative characteristics such as plant's aroma, taste, and shelf life cannot not be easily quantified, measured, and recorded. At this point there is no known instrument that can directly measure those characteristics. There are a few research-based chemoreceptor, chemiresistor, biomimetic smell sensing that have made significant advancement in this field.

Holistic Grow will set the system infrastructure to be compatible with any future commercially available instrument in this field. Additionally, it will utilize currently available instruments such as Spectroscopy, Mass Spectrometry, Chemoreceptor, X-ray fluorescence (XRF), and Energy dispersive X-ray fluorescence (EDXRF) to quantify and identify the correlation between plants' aroma/taste and age, composition of the plants, and growth condition. The novelty of this CPS is that it attempts to measure a wide variety of qualitative characteristics and analog data, and standardize and quantify them in a meaning way for possible data storage, interpretation, and decision making.

Example 1.5. Access to Location for Sampling

To conduct precision farming research, Holistic Grow will collect plant level and location level data for CPS2 to 4 via CPS5. The process includes access of the physical sensor to the location and data transmission of the characteristic to the database. There are several types of sensors and dozens of ambient, phenotype, or quality characteristics that need to be measured. They cannot fit under one method of physical access and data transmission format.

For example, dynamic data capturing unit is a combination of (1) a moving mechanism to the targeted plant and capability to view and measure the plant from different angles (e.g., drone, mobile robot, gantry system, expandable/accordion hose), (2) a maneuverable middle joint (e.g., the same as moving mechanism or a robotic arm), and (3) an end-effector with the option of being multipurpose (e.g., all sensors, camera, chlorophyll reader) or interchangeable for these options. Alternatively, some characteristics may require delivery of sample (e.g., punched leaf or soil sample) for a central/stationary instrument via a bidirectional tubing and pump.

Similarly, data can be transmitted real-time or off-line through wire, memory, or wireless methods depending on the circumstances. Table 2 summarizes major options for data capturing and transmission formats to be investigated in Holistic Grow.

learning, and smart inventory control to replenish nutrients before they are finished or expired. Visual nature of some of the parameters opens up the possibility of 3D geometry storage, integration, and interpretation.

Example 1.7. Computing Unit

The computing unit resembles the brain of the system. The computing unit processes two groups of tasks: (1) online decision making tasks and (2) off-line long-term knowledge generation. Tasks are recorded in databases for future analysis.

Example 1.7.1. Online Decision Making Tasks

Imitating kneejerk reflex in human, the computing unit utilizes current knowledge in the field and activates immediate corrective action based on the circumstances. This task mainly involves parameters and conditions that can be immediately fatal to plants (e.g., high concentrations of ions and compounds, extremely high or low pH, and extreme heat and cold). In some circumstances, computing unit allows for finding alternative lowest cost/fastest implementation decisions among all options (e.g., the addition of nitrogen versus lowering ambient temperature).

Example 1.7.2. Offline Long-Term Knowledge Generation

Imitating deep thinking for long-term decision making for humans, the system looks for many factors and long-term patterns in responses in an off-line mode to create knowledge in the field and set new decisions to achieve optimum

TABLE 2

Options for data capturing and transmission formats in Holistic Grow.

| Type | Access mechanism | Data Transmission | Network | Function | Quantity | End effector |
|---|---|---|---|---|---|---|
| Dynamic Stationary | Fly On wheel/chain/leg Crawling/joint Expandable tube (Sub) In Tube (Sub) Worm digging | Real time Off line | Wireless Wired Hard-disk | Data collection Treatment Both DT | Single Swarm | All in one Interchangeable Single task |

The novelty of this CPS is its versatility and adaptability to the condition. For example, while traveling to a designated field or plant, this CPS should coordinate with multiple other CPS units to incorporate all scheduled data collections (e.g., ambient, phenotype, and quality) in a single travel and select the next designation to minimize overall time and cost.

Example 1.6. Database Structure

Data is a core component of Holistic Grow. Accurate capturing of data, efficient storing of data, and meaning full data analysis are vital to create useful knowledge for practical precision faming and optimization research. All data related to ambient, plant condition and phenotype, nutrient, and end product can be stored in an efficient format.

Figure 8:
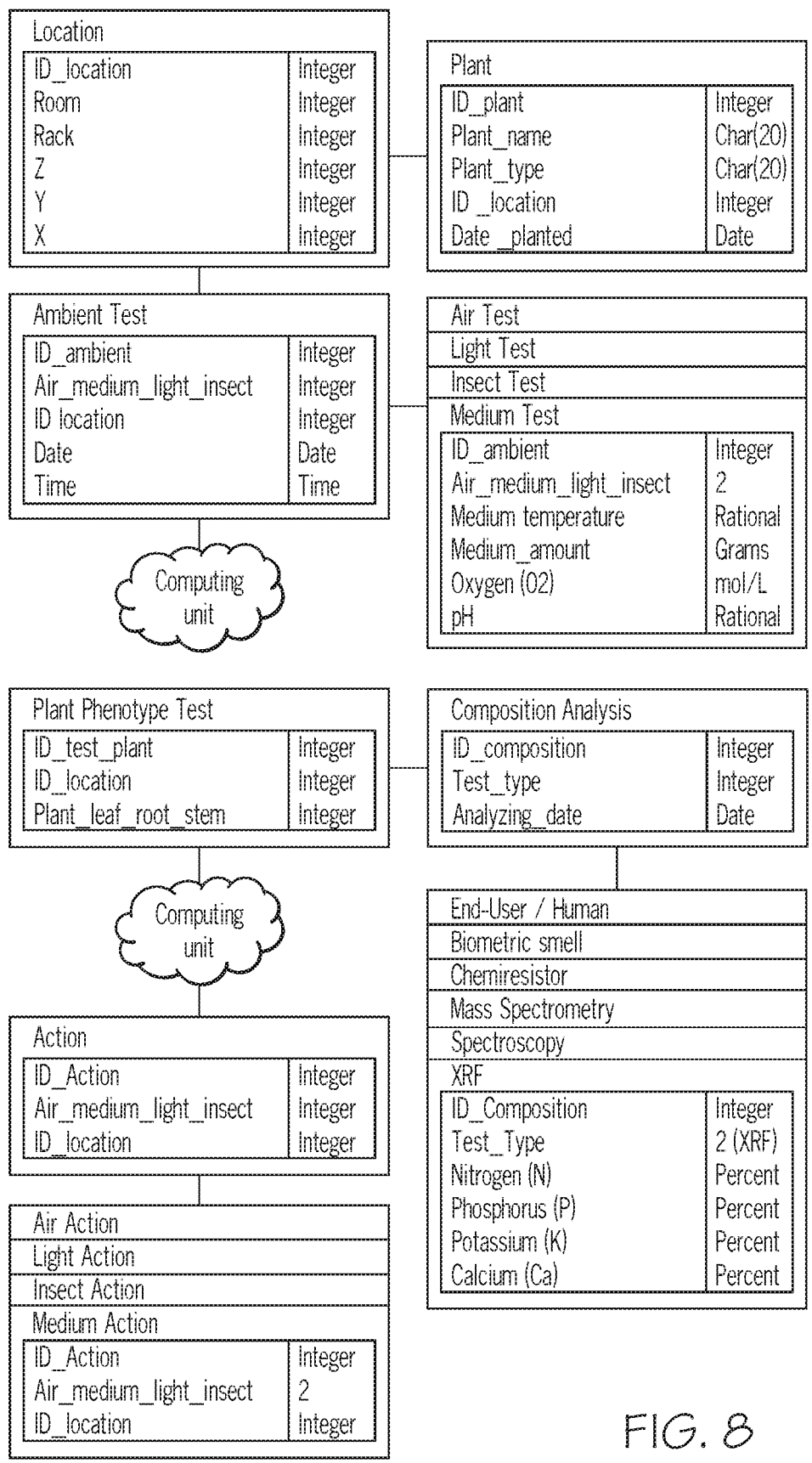
FIG. 8 illustrates the Holistic Grow database structure mapping.
Figure 9:
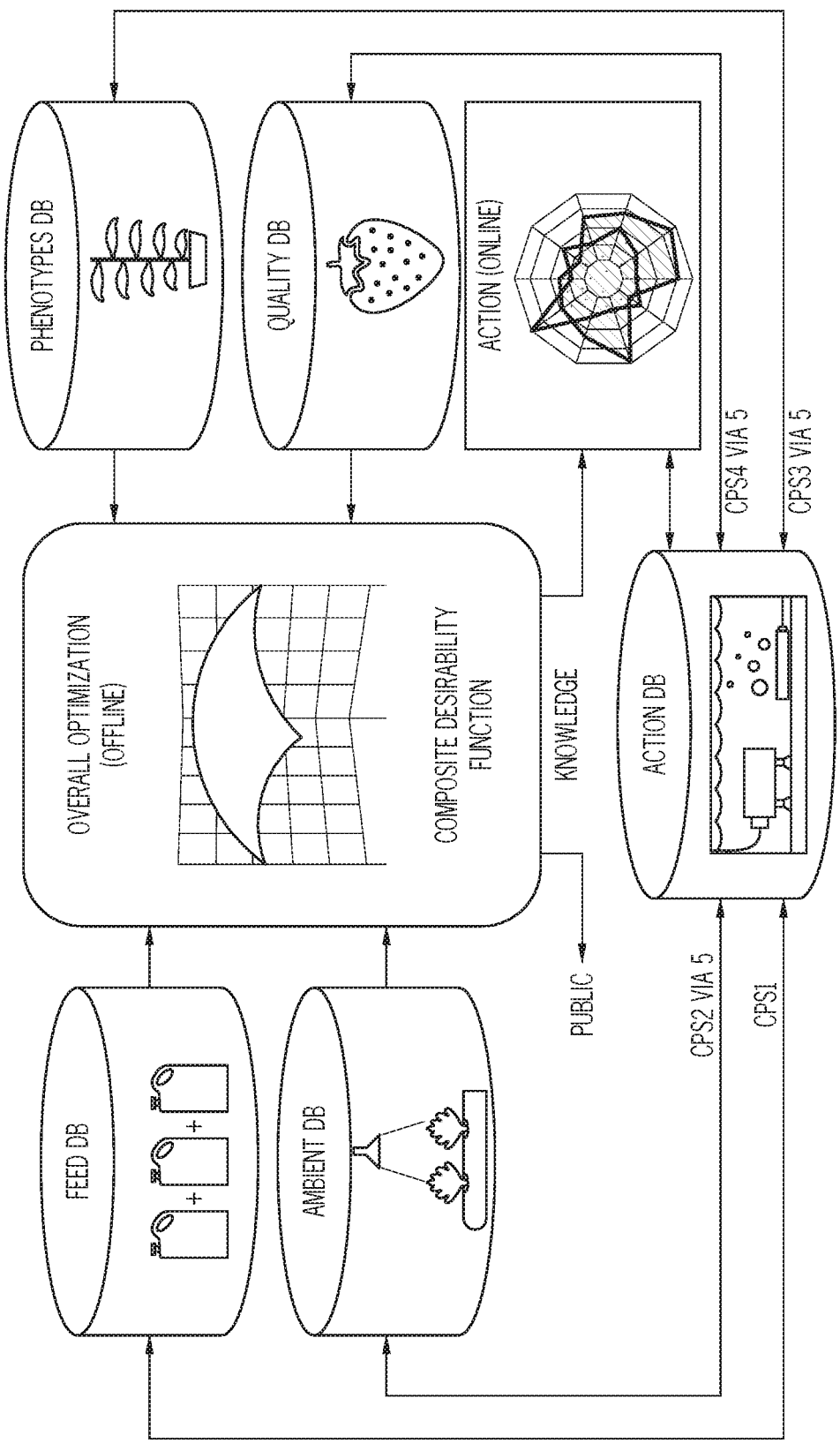
FIG. 9 illustrates the Holistic Grow data analysis for knowledge generation.

An example of a database structure is illustrated in FIG. 8. The database structure can be used for the design of experiments, optimization, knowledge generation, machine quantity and quality for the crop. For more effective knowledge generation, the decision making process will have a hierarchy of design of experiments for input factors, multiple goals, and a desirability function for overall optimization. The decision making process is illustrated in FIG. 9.

Example 1.8. Conceptual and Data Management

The fully autonomous system has the capability of learning from its performance and adapting the created knowledge into its real-time and routine interactions. The computing unit has two levels of tasks: (1) real-time tasks (the computing unit utilizes current knowledge in the field and activates corrective action based on the circumstances), and (2) long-term knowledge generation tasks (all logged input/output data are processed and interpreted and new knowledge replaces routine and real-time tasks levels).

The database structure, retrieval, and processing unit allows for assessing real-time and long-term interaction of one treatment (e.g., adding potassium ion or cooling the solution) on other components (e.g., increasing pH level). Real-time computing unit allows for finding alternative lowest cost and fastest implementation decisions among all options (e.g., the addition of Nitrogen versus lowering ambient temperature).

Example 1.9. Summary

The fully automated Holistic Grow system is capable of actively (1) receiving ambient and plants virtual conditions and physical samples, (2) delivering data and samples securely, (3) storing data and samples in a structured format, (4) retrieving data and samples accurately, (5) processing, integrating, analyzing, and interpreting data and samples, and (6) scheduling and conducting required future actions.

The structured database system allows the computing unit to schedule or cancel any number of future tasks based on the condition. A modular electromechanical system and database allow for any number of end-user, nutrition, ambient control, and analysis mechanism.

The system collects and standardizes a wide variety of inputs from different sensors as scheduled and records the results periodically for long-term analysis while immediate knee jerk reflex for any out of range parameters are added to the list of high priority actions (e.g., high temperature for a very short period of time).

The smart multisampling mechanism will collect enough data from different positions to give a clear perspective for a decision making process. It is optimum that all characteristics are measured in a nondestructive manner and concurrently.

The system attempts to measure a wide variety of qualitative characteristics and analog data, and standardize and quantify them in a meaning way for possible data storage, interpretation, and decision making. Moreover, the system is versatile and adaptive to the condition. For example, while traveling to a designated field or plant, a CPS unit could coordinate with multiple other CPS units to incorporate all scheduled data collections (e.g., ambient, phenotype, and quality) in a single travel and select the next designation to minimize overall time and cost.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of optimizing a property of a plant, said method comprising:
   (a) receiving one or more growth-related parameters of the plant, wherein the one or more growth-related parameters are selected from the group consisting of growth medium pH, growth medium gas levels, growth medium $O_2$ levels, growth medium $CO_2$ levels, growth medium temperature, growth medium algae amount, growth medium volume, ambient humidity, ambient temperature, ambient air composition, ambient $O_2$ levels, ambient $CO_2$ levels, insect levels, growth medium composition, growth medium nutrient levels, growth medium humidity, growth medium microorganism content, growth medium macroorganism content, plant watering schedule, plant feeding schedule, and combinations thereof;
   (b) receiving one or more phenotype-related parameters of the plant, wherein the one or more phenotype-related parameters are selected from the group consisting of plant shape, plant size, plant color, plant chlorophyll content, plant temperature and combinations thereof;
   (c) receiving one or more qualitative parameters of the plant, wherein the one or more qualitative parameters are selected from the group consisting of plant taste, plant aroma, plant shelf life, plant texture, and combinations thereof;
   (d) utilizing a computing unit to evaluate said one or more growth-related parameters, phenotype-related parameters and qualitative parameters of the plant; and
   (e) adjusting one or more of the growth-related parameters of the plant based on said evaluation,
      wherein the adjusting comprises utilizing a mechanical unit to increase or decrease one or more of the growth-related parameters, wherein the mechanical unit provides the computing unit with the one or more growth-related parameters, the one or more phenotype-related parameters, and the one or more qualitative parameters for performing the evaluating step, and wherein the computing unit actuates the mechanical unit to increase or decrease the one or more growth-related parameters, and
      wherein the adjusting enhances one or more plant properties, wherein the one or more plant properties is selected from the group consisting of plant growth rate, plant aroma, plant taste, plant crop generation rate, and combinations thereof.

2. The method of claim 1, wherein the one or more growth-related parameters are received by sampling the growth medium of the plant.

3. The method of claim 1, wherein the one or more growth-related parameters are received by measuring the one or more growth-related parameters, wherein the measuring occurs through the utilization of one or more sensors.

4. The method of claim 1, wherein the one or more phenotype-related parameters are received through the utilization of devices selected from the group consisting of cameras, video recorders, laser scanners, probes, image processors, thermal cameras, thermal sensors, and combinations thereof.

5. The method of claim 1, wherein the evaluation occurs in real-time.

6. The method of claim 1, wherein the computing unit conducts said evaluation by comparing the one or more growth-related parameters, phenotype-related parameters and qualitative parameters of the plant with desirable levels of said parameters.

7. The method of claim 1, wherein the computing unit comprises a machine learning algorithm.

8. The method of claim 7, wherein the computing unit saves the one or more growth-related parameters, phenotype-related parameters and qualitative parameters in real-time onto one or more databases, and wherein the machine learning algorithm accesses the stored information to compute desirable levels of said parameters.

9. The method of claim 1, wherein steps (a)-(e) are repeated a plurality of times, and wherein a machine-learning algorithm is utilized to optimize the adjusting step based on the repeated evaluation of said one or more growth-related parameters, phenotype-related parameters and qualitative parameters of the plant.

10. The method of claim 1, wherein the plant property to be optimized is selected from the group consisting of plant growth rate, plant aroma, plant taste, crop generation rate, and combinations thereof.

11. The method of claim 1, wherein the plant is a crop-generating plant.

12. The method of claim 11, wherein the crop-generating plant is selected from the group consisting of tomato plants, potato plants, wheat, sugarcane, and combinations thereof.

13. A system for optimizing a property of a plant, said system comprising:
(a) a computing unit, wherein the computing unit is operable for receiving one or more growth-related parameters of the plant, wherein the one or more growth-related parameters are selected from the group consisting of growth medium pH, growth medium gas levels, growth medium $O_2$ levels, growth medium $CO_2$ levels, growth medium temperature, growth medium algae amount, growth medium volume, ambient humidity, ambient temperature, ambient air composition, ambient $O_2$ levels, ambient $CO_2$ levels, insect levels, growth medium composition, growth medium nutrient levels, growth medium humidity, growth medium microorganism content, growth medium macroorganism content, plant watering schedule, plant feeding schedule, and combinations thereof,
wherein the computing unit is further operable for receiving one or more phenotype-related parameters of the plant, wherein the one or more phenotype-related parameters are selected from the group consisting of plant shape, plant size, plant color, plant chlorophyll content, plant temperature and combinations thereof,
wherein the computing unit is further operable for receiving one or more qualitative parameters of the plant, wherein the one or more qualitative parameters are selected from the group consisting of plant taste, plant aroma, plant shelf life, plant texture, and combinations thereof, and
wherein the computing unit is further operable to evaluate said one or more growth-related parameters, phenotype-related parameters and qualitative parameters of the plant and adjust one or more of the growth-related parameters of the plant based on said evaluation; and
(b) a mechanical unit, wherein the mechanical unit is operable for providing the computing unit with the one or more growth-related parameters, the one or more phenotype-related parameters, and the one or more qualitative parameters, and wherein the wherein the mechanical unit is operable for adjusting the one or more growth-related parameters upon actuation by the computing unit,
wherein the adjusting comprises utilizing the mechanical unit to increase or decrease one or more of the growth-related parameters, and
wherein the adjusting is operable to enhance one or more plant properties, wherein the one or more plant properties is selected from the group consisting of plant growth rate, plant aroma, plant taste, plant crop generation rate, and combinations thereof.

14. The system of claim 13, wherein the mechanical unit comprises one or more sensors for receiving the one or more growth-related parameters from the plant.

15. The system of claim 13, wherein the mechanical unit is associated with one or more devices for receiving the one or more phenotype-related parameters, wherein the one or more devices is selected from the group consisting of cameras, video recorders, laser scanners, probes, image processors, thermal cameras, thermal sensors, and combinations thereof.

16. The system of claim 13, wherein the computing unit comprises a machine learning algorithm and one or more databases.

17. The system of claim 16, wherein the computing unit is capable of saving the one or more growth-related parameters, phenotype-related parameters and qualitative parameters in real-time onto the one or more databases, and wherein the machine learning algorithm is capable of accessing the stored information.

18. The method of claim 1, wherein the mechanical unit is associated with an automated compensating mechanism, wherein the automated compensating mechanism increases or decreases the growth-related parameters in a single adjustment or in multiple dosages over a prescribed time frame.

19. The system of claim 13, wherein the mechanical unit is associated with an automated compensating mechanism, wherein the automated compensating mechanism increases or decreases the growth-related parameters in a single adjustment or in multiple dosages over a prescribed time frame.

* * * * *